United States Patent
Dion et al.

(10) Patent No.: US 11,303,560 B2
(45) Date of Patent: Apr. 12, 2022

(54) HCPE-BASED INTELLIGENT PATH SELECTION OVER A MULTIPATH NETWORK

(71) Applicant: Nokia Technologies Oy, Espoo (FI)

(72) Inventors: Gino Dion, Quispamsis (CA); Randall Sharpe, Chapel Hill, NC (US); Steven Morin, Ottawa (CA)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/705,379

(22) Filed: Sep. 15, 2017

(65) Prior Publication Data

US 2019/0089623 A1 Mar. 21, 2019

(51) Int. Cl.
*H04L 12/707* (2013.01)
*H04L 45/24* (2022.01)
*H04L 47/11* (2022.01)
*H04N 21/61* (2011.01)
*H04L 45/00* (2022.01)
(Continued)

(52) U.S. Cl.
CPC ............ *H04L 45/24* (2013.01); *H04L 45/22* (2013.01); *H04L 47/11* (2013.01); *H04L 47/2408* (2013.01); *H04L 47/2483* (2013.01); *H04L 69/14* (2013.01); *H04N 21/6118* (2013.01);
(Continued)

(58) Field of Classification Search
CPC .................. H04L 45/24; H04L 69/16
See application file for complete search history.

(56) References Cited

U.S. PATENT DOCUMENTS 6,452,915 B1 * 9/2002 Jorgensen ............... H04L 47/14
370/338
7,047,313 B1 * 5/2006 Broerman ............. H04L 69/163
709/238

(Continued)

OTHER PUBLICATIONS

Broadband Forum, "Hybrid Access Broadband Network Architecture," Broadband Forum Technical Report, TR-348, Issue 1, Jul. 2016, 49 pages.

(Continued)

*Primary Examiner* — Huy D Vu
*Assistant Examiner* — Bailor C. Hsu
(74) *Attorney, Agent, or Firm* — Tong, Rea, Bentley & Kim, LLC

(57) ABSTRACT

The present disclosure generally discloses a path selection capability configured to support intelligent path selection within the context of a hybrid-access communication network including a hybrid-access gateway (HAG) and a hybrid-access customer premises equipment (HCPE) in communication based on a multipath communication capability. The path selection capability is configured to support HCPE-based intelligent path selection for downlink traffic being provided from the HAG to the HCPE for delivery to CPEs supported by the HCPE. The path selection capability is configured to support HCPE-based intelligent path selection based on flow identification information signaled from the HAG to the HCPE based on determination of the flow identification information of the downlink traffic by the HAG. The HCPE-based intelligent path selection enables the HCPE to control the path(s) (e.g., multipath subflow(s) of a multipath connection) over which the downlink traffic is sent from the HAG to the HCPE.

26 Claims, 5 Drawing Sheets

(51) Int. Cl.
*H04L 47/2408* (2022.01)
*H04L 47/2483* (2022.01)
*H04L 69/14* (2022.01)
*H04N 21/6371* (2011.01)
*H04L 69/16* (2022.01)

(52) U.S. Cl.
CPC ..... *H04N 21/6131* (2013.01); *H04N 21/6371* (2013.01); *H04L 69/16* (2013.01)

(56) References Cited

U.S. PATENT DOCUMENTS

| | | | | |
|---|---|---|---|---|
| 7,099,277 | B2* | 8/2006 | Sahinoglu | H04L 12/5692 370/238 |
| 7,760,760 | B2 | 7/2010 | Dion et al. | |
| 8,942,098 | B2* | 1/2015 | Daraiseh | H04W 40/14 370/235 |
| 9,578,109 | B2* | 2/2017 | Biswas | H04L 67/142 |
| 9,871,723 | B2* | 1/2018 | Teyeb | H04L 45/24 |
| 10,070,348 | B2* | 9/2018 | Begen | H04W 36/0022 |
| 10,091,097 | B2* | 10/2018 | Lin | H04L 45/02 |
| 10,250,491 | B2* | 4/2019 | Lee | H04L 65/103 |
| 10,581,813 | B2* | 3/2020 | Watfa | H04L 63/0485 |
| 2006/0153070 | A1* | 7/2006 | DelRegno | H04M 3/2254 370/229 |
| 2011/0019549 | A1* | 1/2011 | Strulo | H04L 45/123 370/232 |
| 2014/0351447 | A1 | 11/2014 | Annamalaisami et al. | |
| 2014/0355536 | A1* | 12/2014 | Muley | H04W 28/0215 370/329 |
| 2015/0043349 | A1* | 2/2015 | Zhu | H04W 48/18 370/235 |
| 2015/0201046 | A1 | 7/2015 | Biswas | |
| 2015/0215225 | A1 | 7/2015 | Mildh et al. | |
| 2015/0237525 | A1 | 8/2015 | Mildh et al. | |
| 2015/0341271 | A1* | 11/2015 | Cortes Gomez | H04L 47/11 370/236 |
| 2016/0380884 | A1* | 12/2016 | Sarikaya | H04W 8/08 370/389 |
| 2017/0005830 | A1* | 1/2017 | Zhang | H04L 12/4633 |
| 2017/0054631 | A1* | 2/2017 | Horn | H04L 69/14 |
| 2017/0085484 | A1* | 3/2017 | Hellander | H04L 69/14 |
| 2017/0118081 | A1* | 4/2017 | Rius I Riu | H04L 41/08 |
| 2017/0311209 | A1* | 10/2017 | Begen | H04W 36/0022 |
| 2017/0318130 | A1* | 11/2017 | Ripke | H04L 69/16 |
| 2017/0318507 | A1* | 11/2017 | Vikberg | H04W 76/15 |
| 2018/0103123 | A1* | 4/2018 | Skog | H04L 67/142 |

OTHER PUBLICATIONS

Dreibholz, "An IPv4 Flowlabel Option," https://tools.ietf.org/pdf/draft-dreibholz-ipv4-flowlabel-25.pdf, Network Working Group, Jan. 23, 2017, 8 pages.
Nichols, et al., "Definition of Differentiated Services Field (DS Field) in the IPv4 and IPv6 Headers," RFC2474, Network Working Group, Dec. 1998, 20 pages.
Blake, et al., "An Architecture for Differentiated Services," RFC2475, Network Working Group, Dec. 1998, 36 pages.
Heinanen, et al., "Assured Forwarding PHB Group," RFC2597, Network Working Group, Jun. 1999, 11 pages.
Jacobson, et al., "An Expedited Forwarding PHB," RFC2598, Network Working Group, Jun. 1999, 11 pages.
Ramakrishnan, et al., "The Addition of Explicit Congestion Notification (ECN) to IP," RFC3168, Network Working Group, Sep. 2001, 63 pages.
Grossman, "New Terminology and Clarifications for Diffserv," RFC3260, Network Working Group, Apr. 2002, 10 pages.
Hu, Q., et al., "Survey of Proposed Use Cases for the IPv6 Flow Label," RFC6294, Independent Submission, Jun. 2011, 18 pages.
Amante, et al., "IPv6 Flow Label Specification," RFC6437, Internet Engineering Task Force (IETF), Nov. 2011, 15 pages.
Ford, et al., "TCP Extensions for Multipath Operation with Multiple Addresses," RFC6824, Internet Engineering Task Force (IETF), Jan. 2013, 64 pages.
O. Bonaventure et. al., "Use Cases and Operational Experience with Multipath TCP, draft-ietf-mptcp-experience-05", MPTCP Working Group, Jul. 8, 2016, 36 pages.
International Search Report and Written Opinion mailed in corresponding PCT/US2018/050842 dated Dec. 12, 2018, 20 pages.

* cited by examiner

US 11,303,560 B2

HCPE-BASED INTELLIGENT PATH SELECTION OVER A MULTIPATH NETWORK

TECHNICAL FIELD

The present disclosure relates generally to communication networks and, more particularly but not exclusively, to supporting intelligent path selection over multipath networks.

BACKGROUND

While broadband access networks serving end users are continually evolving to increase traffic speeds supported for the end users, service providers continue to search for other techniques to increase traffic speeds supported for the end users. One such technique to increase the traffic speed supported for an end user is to aggregate multiple access network paths available to the end user into a single logical connection for the end user. This technique allows service providers to combine access across a multitude of wireline and wireless access technologies, such as using a combination of Digital Subscriber Line (DSL) access and Long Term Evolution (LTE) access, Data Over Cable Service Interface Specification (DOCSIS) access and LTE access, LTE access and Wi-Fi access, satellite access and LTE access, and so forth. It will be appreciated that this technique may be supported using multipath technology (e.g., Multipath Transmission Control Protocol (MPTCP)) or using other technologies configured to aggregate multiple access network paths available to the end user into a single logical connection for the end user. This technique allows the traffic for the end users to be aggregated across the multiple access technologies to provide increased traffic speeds for the end user. This technique also may be used for other purposes.

SUMMARY

The present disclosure generally discloses a path selection capability that is configured to support intelligent path selection within the context of a hybrid-access communication network including a hybrid-access gateway (HAG) and a hybrid-access customer premises equipment (HCPE) that are in communication based on a multipath communication capability.

In at least some embodiments, an apparatus is provided. The apparatus is configured to support HCPE-based intelligent path selection over a multipath network. The apparatus includes a processor and a memory communicatively connected to the processor. The processor is configured to receive, by an HCPE from a HAG via a multipath connection between the HCPE and the HAG, downlink traffic intended for a customer premises equipment (CPE) associated with the HCPE. The processor is configured to determine, by the HCPE from the downlink traffic based on a marker signaled within the downlink traffic, flow identification information associated with the downlink traffic. The processor is configured to initiate, by the HCPE based on the flow identification information and a policy of the HCPE, path selection for the downlink traffic. In at least some embodiments, a non-transitory computer-readable storage medium stores instructions which, when executed by a computer, cause the computer to perform a corresponding method for supporting HCPE-based intelligent path selection over a multipath network. In at least some embodiments, a corresponding method for supporting HCPE-based intelligent path selection over a multipath network is provided.

In at least some embodiments, an apparatus is provided. The apparatus is configured to support HCPE-based intelligent path selection over a multipath network. The apparatus includes a processor and a memory communicatively connected to the processor. The processor is configured to receive, by a HAG, downlink traffic intended for a customer premises equipment (CPE) associated with an HCPE. The processor is configured to determine, based on deep packet inspection of the downlink traffic, flow identification information associated with the downlink traffic. The processor is configured to modify the downlink traffic, based on the flow identification information associated with the downlink traffic, to form marked downlink traffic that includes a marker indicative of the flow identification information. The processor is configured to send, by the HAG toward the HCPE via a multipath connection between the HAG and the HCPE, the marked downlink traffic. In at least some embodiments, a non-transitory computer-readable storage medium stores instructions which, when executed by a computer, cause the computer to perform a corresponding method for supporting HCPE-based intelligent path selection over a multipath network. In at least some embodiments, a corresponding method for supporting HCPE-based intelligent path selection over a multipath network is provided.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure generally discloses a path selection capability that is configured to support intelligent path selection within the context of a hybrid-access communication network including a hybrid-access gateway (HAG) and a hybrid-access customer premises equipment (HCPE) that are in communication based on a multipath communication capability. The path selection capability is configured to support HCPE-based intelligent path selection for downlink traffic being provided from the HAG to the HCPE for delivery to CPEs supported by the HCPE. The path selection capability is configured to support HCPE-based intelligent path selection based on flow identification information signaled from the HAG to the HCPE based on determination of the flow identification information of the downlink traffic by the HAG. It is noted that the flow identification information may include application flow identification information for an application flow of an application, service flow identification information for a service flow of a service, or flow identification information for any other suitable flow which may be included within the downlink traffic (and, thus, also may be referred to herein as application, service, or flow identification information). The HCPE-based intelligent path selection enables the HCPE to control the path(s) (e.g., multipath subflow(s) of a multipath connection) over which the downlink traffic is sent from the HAG to the HCPE. It will be appreciated that these and various other embodiments and advantages and potential advantages of the path selection capability may be further understood by way of reference to the example communication system of FIG. 1.

Figure 1:
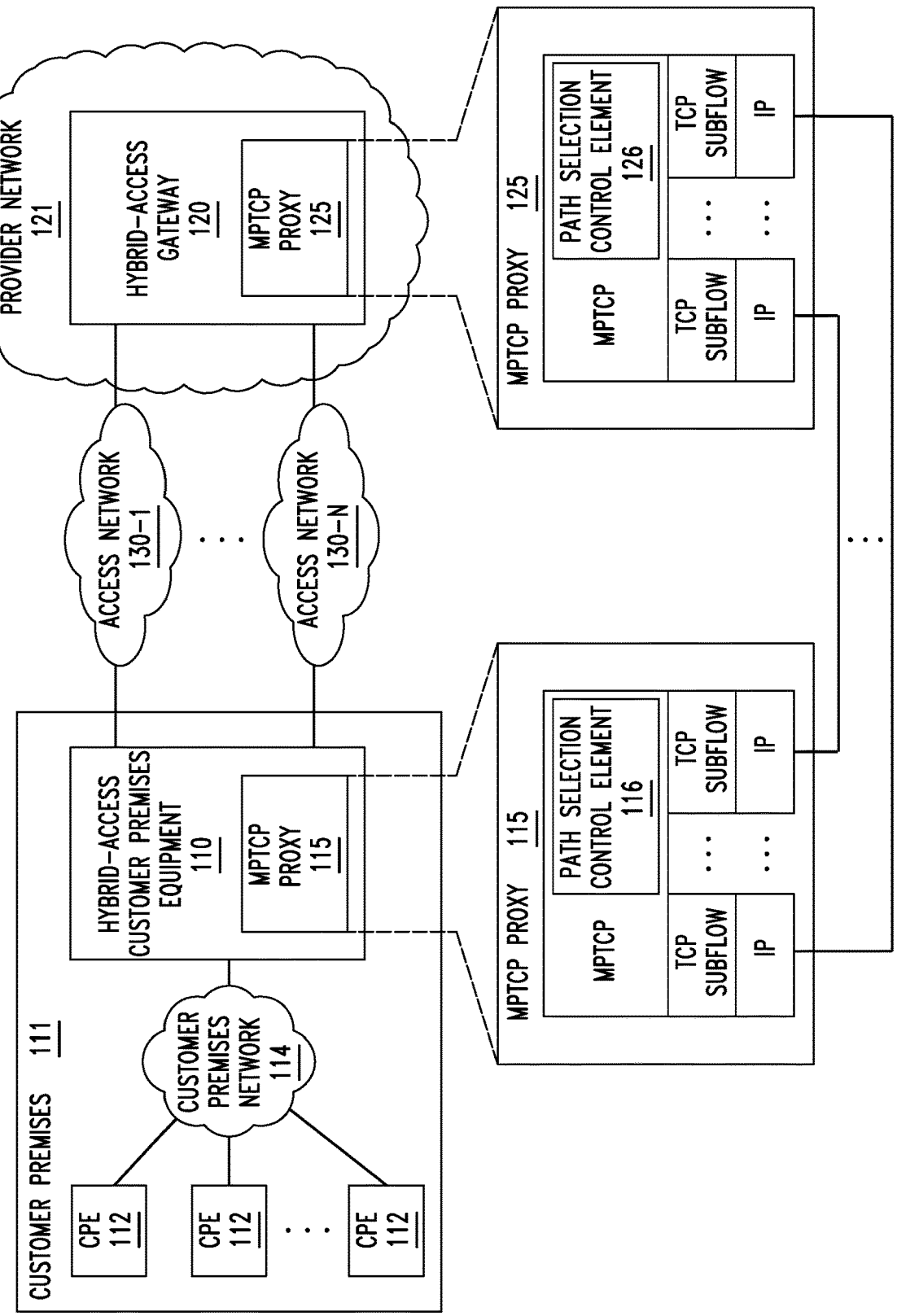
FIG. 1 depicts a communication system configured to support hybrid-access customer premises equipment (HCPE)-based intelligent path selection for downlink traffic over a multipath connection between a hybrid-access gateway (HAG) and an HCPE.

FIG. 1 depicts a communication system configured to support HCPE-based intelligent path selection for downlink traffic over a multipath connection between a HAG and an HCPE.

The communication system 100 includes a hybrid-access customer premises equipment (HCPE) 110 and a hybrid-access gateway (HAG) 120 that are configured to communicate via a set of access networks 130-1-130-N (collectively, access networks 130). The hybrid-access elements of the communication system 100 may support various functions as defined in the Broadband Forum TR-348 specification.

The HCPE 110 is located at a customer premises 111 and is configured to operate as a gateway of the customer premises 111 for a set of customer premises equipments (CPEs) 112 located at the customer premises 111. The HCPE 110 is configured to communicate via each of the access networks 130, for supporting use of multiple access networks 130 to communicate traffic between the HCPE 110 and the HAG 120. The HCPE 110 is configured to communicate with each of the CPEs 112 at the customer premises 111. The HCPE 110 may communicate with the CPEs 112 at customer premises 111 via a customer premises network 114 (e.g., a local area network (LAN) or other type of network supporting suitable local communication capabilities). The CPEs 112 may include various types of end user device which may located at the customer premises 111 (e.g., telephones, computers, smart televisions, gaming systems, Internet-of-Things (IoT) devices, or the like, as well as various combinations thereof).

The HAG 120 is deployed within a service provider network (SPN) 121 and is configured to operate as a gateway of the SPN 121 for the HCPE 110 (as well as for other HCPEs associated with other customer premises, which have been omitted for purposes of clarity). The HAG 120 is configured to communicate via each of the access networks 130, for supporting use of multiple access networks 130 in order to communicate traffic between the HAG 120 and the HCPE 110. The HAG 120 is configured to communicate with various other elements of the SPN 121 as well as any other elements which may be accessible via SPN 121 and any other communication networks reachable via the SPN 121 (e.g., private data networks such as data center networks or enterprise networks, public data networks such as the Internet, or the like, as well as various combinations thereof).

The access networks 130 may include any access networks which may support communication between the HCPE 110 and the HAG 120. The access networks 130 may include one or more wireline access networks, one or more wireless access networks, or the like, as well as various combinations thereof. For example, the access networks 130 may include one or more of a digital subscriber line (DSL) access network, a Data Over Cable Service Interface Specification (DOCSIS) access network, a passive optical network (PON) access network, a cellular access network (e.g., Third Generation (3G) cellular access networks, a Fourth Generation (4G) cellular access network (e.g., a Long Term Evolution (LTE) access network), a Fifth Generation (5G) cellular access network, or the like), a fixed wireless access network, a WiFi access network, a satellite access network, or the like. The access networks 130 may include any other suitable type(s) of wireline or wireless access networks.

The HCPE 110 and the HAG 120 are configured to communicate using the access networks 130 based on a multipath communication capability. The multipath communication capability enables transport of traffic of a data connection using a multipath connection composed of multiple transport subflows which may be established via a single access network 130 or multiple access networks 130. The multipath communication capability may be provided using Multipath Transmission Control Protocol (MPTCP), in which case traffic of a data connection is transported using an MPTCP connection between the HAG 120 and the HCPE 110 where the MPTCP connection is composed of multiple TCP subflows between the HAG 120 and the HCPE 110. It is noted that an example of use of an MPTCP connection for the multipath connection between the HAG 120 and the HCPE 110 is depicted in FIG. 1. It is noted that the multipath communication capability may be provided using other multipath communication technologies.

The HCPE 110 and the HAG 120 are configured to support the MPTCP connection using a pair of MPTCP proxies including an MPTCP proxy 115 on the HCPE 110 and an MPTCP proxy 125 on the HAG 120. The MPTCP connection is established between the MPTCP proxy 115 and the MPTCP proxy 125. The MPTCP connection is composed of multiple TCP subflows. The TCP subflows of the MPTCP connection may be provided over one or more of the access networks 130 (e.g., each TCP subflow may be provided over a separate access network 130, one or more TCP subflows may share an access network 130, or the like, as well as various combinations thereof).

The HCPE 110 and the HAG 120 are configured to cooperate to support HCPE-based intelligent path selection for downlink traffic intended for one of the CPEs 112 of the customer premises 111 of HCPE 110.

The HCPE 110 and the HAG 120 are configured to cooperate to support delivery of the downlink traffic intended for one of the CPEs 112 of the customer premises 111 of HCPE 110. The CPE 112 requests content from an application or service by sending a request to a server that is hosting the application or service. For example, the request may be a web browsing request, a request for streaming video, or the like. The application or service receives the request and responds to the request by sending content intended for delivery to the CPE 112. For example, the content may be web browsing content provided responsive to a web browsing request, streaming video content provided responsive to a video content request, or the like. The downlink traffic transporting the content intended for delivery to the CPE 112 is received by the HAG 120. The HAG 120 is configured to send the downlink traffic to the HCPE 110 via an MPTCP connection between the HAG 120 and the HCPE 110. The HCPE 110 is configured to receive the downlink traffic from the HAG 120 via the MPTCP connection. The HCPE 110 is configured to identify the CPE 112 for which the content is intended and to send the downlink traffic to the CPE 112 for which the content is intended for delivery of the content to the CPE 112.

The HCPE 110 and the HAG 120 are configured to cooperate to support HCPE-based intelligent path selection for the downlink traffic intended for one of the CPEs 112 of the customer premises 111 of HCPE 110. The HAG 120 is configured to receive the downlink traffic transporting the content intended for delivery to the CPE 112. The HAG 120 is configured to determine application, service, or flow identification information of the downlink traffic transporting the content intended for delivery to the CPE 112. It is noted that the application, service, or flow identification information may include application flow identification information for an application flow of an application, service flow identification information for a service flow of a service, or flow identification information for any other suitable flow which may be included within the downlink traffic (and, thus, as indicated above, also may be referred to more generally herein as flow identification information). The application, service, or flow identification information may be determined based on analysis (e.g., using deep packet inspection (DPI)) of the downlink traffic by the HAG 120. The application, service, or flow identification information may include application, service, or flow type information (e.g., information indicative that the content is web content, video content, or the like), application, service, or flow specifics information (e.g., information indicative that the content is GOOGLE web content, NETFLIX video, YOUTUBE video, or the like), or the like, as well as various combinations thereof. The HAG 120 is configured to perform path selection for the downlink traffic based on the application, service, or flow identification information of the downlink traffic and associated policies available to the HAG 120. The HAG 120 also is configured to signal indications of the application, service, or flow identification information to the HCPE 110 for use by the HCPE 110 in performing intelligent path selection for the downlink traffic. The HAG 120 is configured to signal indications of the application, service, or flow identification information to the HCPE 110 within the downlink traffic itself using in-band signaling. The HCPE 110 is configured to receive the indications of the application, service, or flow identification information via the in-band signaling and to perform intelligent path selection based on the indications of the application, service, or flow identification information, thereby enabling the HCPE 110 to support more advanced path selection capabilities (e.g., beyond path selection that is merely based on cost, latency, capacity, and/or duration) without requiring the HCPE 110 to support advanced traffic analysis capabilities (e.g., DPI) and without requiring a dedicated signaling mechanism (e.g., signaling channel, protocol, or the like) from the HAG 120 to the HCPE 110.

The HCPE 110 and the HAG 120 are configured to support in-band signaling of application, service, or flow identification information from the HAG 120 to the HCPE 110.

The in-band signaling of application, service, or flow identification information from the HAG 120 to the HCPE 110 may be based on mappings between signaled values and application, service, or flow identification information maintained by the HAG 120 and the HCPE 110. The application, service, or flow identification information of the downlink traffic may include at least one of an indication of an application, service, or flow type of the downlink traffic (e.g., an indication that the downlink traffic is web traffic, video traffic, software patch download traffic, or the like), an indication of a specific application, service, or flow of the downlink traffic (e.g., an indication that the downlink traffic is GOOGLE web traffic, NETFLIX video traffic, YOUTUBE video traffic, MICROSOFT software patch traffic, or the like), or the like, as well as various combinations thereof. The mappings between the signaled values and application, service, or flow identification information may be configured on the HAG 120 and the HCPE 110 such that the HAG 120 and the HCPE 110 agree on identification of application, service, or flow identification information based on the signaled values. The configuration of the HAG 120 and the HCPE 110 with the mapping information for the mappings between the signaled values and the application, service, or flow identification information may be performed using any suitable configuration capabilities (e.g., using an Auto Configuration Server (ACS) solution that is based on the Broadband Forum TR-069 protocol or other suitable configuration capabilities or device management capabilities).

The in-band signaling of application, service, or flow identification information from the HAG 120 to the HCPE 110 may utilize various in-band signaling techniques, at least some of which are discussed in additional detail below.

In at least some embodiments, in-band signaling of application, service, or flow identification information from the HAG 120 to the HCPE 110 may be performed based on Differentiated Services Code Point (DSCP) markings. DSCP is defined in various Internet Engineering Task Force (IETF) Requests for Comment (RFCs), such as RFC2474, RFC2475, RFC2597, RFC2598, RFC3168, RFC3260, and others. DSCP makes use of the 8 bit IPv4 type of service (TOS) field, but remains compatible (to a certain extent, excluding the explicit congestion notification (ECN) 2-bit field) with the TOS field. The signaling of application, service, or flow identification information from the HAG 120 to the HCPE 110 based on DSCP markings may be based on mappings, between DSCP values and application, service, or flow identification information, that are maintained by the HAG 120 and the HCPE 110. It is noted that, while the set of available DSCP values is limited in size, the set of DSCP values should be sufficient to handle the various foreseeable HCPE-based path selection use cases.

In at least some embodiments, in-band signaling of application, service, or flow identification information from the HAG 120 to the HCPE 110 may be performed based on TCP source port markings. The signaling of application, service, or flow identification information from the HAG 120 to the HCPE 110 based on TCP source port markings may be based on mappings, between TCP source port values and application, service, or flow identification information, that are maintained by the HAG 120 and the HCPE 110. It is noted that, where the TCP source port field is used for signaling application, service, or flow identification information, the application, service, or flow identification information may be signaled in the TCP source port field of TCP session initialization responses. It is noted that the HAG 120 may be configured to perform TCP source port translation in cases where the original source port needs to be retained. It is noted that the TCP source port field is two bytes long, thereby enabling support for 65,536 values for use in indicating application, service, or flow identification information. It is noted that, TCP source port markings may be used where the DSCP field is already in use by the service provider for managing access network traffic, when more granular identification of the access network traffic is required, or under other conditions.

In at least some embodiments, in-band signaling of application, service, or flow identification information from the HAG 120 to the HCPE 110 may be performed based on IP flow label markings. IP flow labels are defined in various IETF RFCs (e.g., RFC 6294, RFC 6437, or the like), various IETF drafts (e.g., the https://tools.ietforg/pdf/draft-dreibholz-ipv4-flowlabel-25.pdf" draft for IPv4 implementations or the like), and so forth. The signaling of application, service, or flow identification information from the HAG 120 to the HCPE 110 based on IP flow label markings may be based on mappings, between IP flow label values and application, service, or flow identification information, that are maintained by the HAG 120 and the HCPE 110.

The in-band signaling of application, service, or flow identification information from the HAG 120 to the HCPE 110 may be further understood by way of reference to an example. In this example, it is assumed that a four-bit value is used for the in-band signaling of application, service, or flow identification information from the HAG 120 to the HCPE 110. In this example, it is further assumed that a value of 0011 is used to indicate that downlink traffic is video traffic and a value of 1010 is used to indicate that downlink traffic is NETFLIX video traffic. The HAG 120 receives the downlink traffic and, based on DPI analysis of the downlink traffic, determines that the downlink traffic is NETFLIX video traffic. The HAG 120, based on mapping information, determines that the 1010 value is used to indicate that downlink traffic is NETFLIX video traffic. The HAG 120 modifies one or more packets of the downlink traffic to include the value of 1010 which is indicative of NETFLIX video traffic. The HAG 120 sends the downlink traffic to the HCPE 110 via the MPTCP connection between the HAG 120 and the HCPE 110. The HCPE 110 receives the downlink traffic from the HAG 120 via the MPTCP connection. The HCPE 110 identifies the 1010 value in the downlink traffic received from the HAG 120. The HCPE 110, based on mapping information, determines that the 1010 value is used to indicate that downlink traffic is NETFLIX video traffic and, as such, thereby determines that that the downlink traffic is transporting NETFLIX video traffic. The HCPE 110 may then use the knowledge that the downlink traffic is transporting NETFLIX video traffic to perform intelligent path selection for subsequent downlink traffic of this flow.

It is noted that the in-band signaling of application, service, or flow identification information from the HAG 120 to the HCPE 110 may be performed using various other fields, values, or the like, as well as various combinations thereof.

The HCPE 110 is configured to perform intelligent path selection for the downlink traffic.

The intelligent path selection for the downlink traffic that is performed by the HCPE 110 may be provided in various ways. The intelligent path selection for the downlink traffic may include granular path selection (e.g., path selection per application, service, or flow) beyond the more generic path selection which may be provided by the HCPE 110 based on information available at the HCPE 110 (e.g., HCPE link status information (e.g., cost, latency, capacity, duration or the like), HCPE device information (e.g., device status, device requirements, or the like), or the like, as well as various combinations thereof). The intelligent path selection for the downlink traffic may be performed by the HCPE 110 based on the application, service, or flow identification information of the downlink traffic that is extracted from the downlink traffic by the HCPE 110. The intelligent path selection for the downlink traffic may be performed by the HCPE 110 based on policy information available at the HCPE 110. The intelligent path selection for the downlink traffic may be performed by controlling the set of transport subflows of the multipath connection used to transport the downlink traffic (e.g., controlling selection of one or more transport subflows of the multipath connection used to transport the downlink traffic, controlling modification of one or more transport subflows of the multipath connection used to transport the downlink traffic, or the like, as well as various combinations thereof). The set of transport subflows of the multipath connection used to transport the downlink traffic may be controlled by initiating addition of one or more new transport subflows to the multipath connection, initiating modification of one or more existing transport subflows of the multipath connection (e.g., initiating a change in priority of one or more of the transport subflows, such as by changing a preferred path to a backup path, changing a backup path to a preferred path, or the like, as well as various combinations thereof), initiating termination of one or more existing transport subflows of the multipath connection (e.g., in order to force the downlink traffic onto one or more other transport subflows of the multipath connection which are active for the multipath connection), or the like, as well as various combinations thereof. The intelligent path selection for the downlink traffic that is performed by the HCPE 110 may be provided using various other capabilities or techniques.

The HCPE 110 is configured to perform intelligent path selection for the downlink traffic based on the application, service, or flow identification information of the downlink traffic that is received from the HAG 120 and path selection policy information of the HCPE 110.

The HCPE 110 may be configured to identify, from the path selection policy information of the HCPE 110 based on the application, service, or flow identification information of the downlink traffic that is received from the HAG 120, a path selection policy to be applied by the HCPE 110 for the downlink traffic. The path selection policy may specify one or more sets of transport subflows to be used for the downlink traffic, one or more conditions for controlling use of the one or more sets of transport subflows, or the like, as well as various combinations thereof. The path selection policy may include a rule indicative that the downlink traffic is to be switched from using a first set of transport subflows of the multipath connection to using a second set of transport subflows of the multipath connection based on a condition being satisfied. The first and second sets of transport subflows of the multipath connection may be defined in various ways (e.g., the first set of transport subflows of the multipath connections includes a first transport subflow of the multipath connection and the second set of transport subflows of the multipath connections includes a second transport subflow of the multipath connection, the first set of transport subflows of the multipath connections includes all transport subflows of the multipath connection and the second set of transport subflows of the multipath connections includes only a single transport subflow of the multipath connection, or the like). The condition may include one or more of a threshold length of time passing, a threshold amount of data being received, a buffer fill level being satisfied, or the like, as well as various combinations thereof. For example, a path selection policy may specify that downlink streaming video traffic is to be sent over DSL initially and then moved from DSL to satellite after a threshold buffer fill level is reached. For example, a path selection policy may specify that, if one of the paths is not performing reliably (e.g., a cellular network path impaired by congestion, a fixed wireless path impaired by fog, or the like), the downlink traffic can be switched to a more reliable path (e.g., by changing priority levels of the paths, by terminating the transport subflow over the unreliable path, or the like). It will be appreciated that various other policies (e.g., based on various other combinations of access technologies, various other conditions, various other path selection control capabilities, or the like, as well as various combinations thereof) may be available and applied at the HCPE 110 for controlling path selection for downlink traffic. It is noted that the use of such relatively simple conditions for controlling path selection for downlink traffic enables the HCPE 110 to use relatively simple monitoring mechanisms (e.g., time monitoring mechanisms (e.g., clocks, counters, or the like), traffic accounting mechanisms (e.g., determining that "X" amount of data is received over "Y" time on a given TCP connection or the like), buffer monitoring mechanisms (e.g., for monitoring the fill level of a buffer or the like), or the like), rather than more complicated DPI processing capabilities, for controlling path selection for downlink traffic.

The HCPE 110 may be configured to apply a path selection policy, identified by the HCPE 110 based on the application, service, or flow identification information of the downlink traffic that is received from the HAG 120 and path selection policy information of the HCPE 110, for the downlink traffic in various ways. The HCPE 110 may be configured to apply a path selection policy for the downlink traffic, being transported by a multipath connection, by controlling the set of transport subflows of the multipath connection. The HCPE 110 may be configured to control the set of transport subflows of the multipath connection by controlling selection of one or more transport subflows of the multipath connection, controlling modification of one or more transport subflows of the multipath connection, or the like, as well as various combinations thereof. The HCPE 110 may be configured to control the set of transport subflows of the multipath connection by initiating addition of one or more new transport subflows to the multipath connection, initiating modification of one or more existing transport subflows of the multipath connection (e.g., initiating a change in priority of one or more of the transport subflows), initiating termination of one or more existing transport subflows of the multipath connection, or the like, as well as various combinations thereof. In at least some embodiments, initiating a change in priority of a transport subflow may be performed using a Request for Comments (RFC) 6824 Change Subflow Priority (MP PRIO) Option Backup (B) flag, where the HCPE 110 sends the MP PRIO B flag to the HAG 120 for one of the transport subflows and the HAG 120 changes the priority of the one of the transport subflows based on the MP PRIO B flag. For example, where the path selection policy indicates that downlink streaming video traffic is to be sent over DSL initially and then moved from DSL to satellite after a threshold buffer fill level is reached, the HCPE 110, when the threshold buffer fill level is reached, may send to the HAG 120 an indication that the DSL-based transport subflow is to be used as a backup path and that the satellite-based transport subflow is to be used as a preferred path for the downlink streaming video traffic (in which case the DSL-based transport subflow, although not carrying the downlink streaming video traffic, remains active and, thus, may be used for uplink communications related to the downlink streaming video traffic). For example, where the path selection policy indicates that downlink streaming video traffic is to be sent over DSL initially and then moved from DSL to satellite after a threshold buffer fill level is reached, the HCPE 110 may initiate termination of the DSL-based transport subflow when the threshold buffer fill level is reached so that the downlink traffic is forced onto the remaining satellite-based transport subflow. The HCPE 110 may be configured to apply a path selection policy for the downlink traffic in various other ways.

It is noted that the intelligent path selection for the downlink traffic by the HCPE 110 may be further based on information available locally at the HCPE 110 (e.g., HCPE link status information, HCPE device information, multipath connection duration, or the like, as well as various combinations thereof). The intelligent path selection for the downlink traffic may be performed based on complex path selection rules which may be applied by the HCPE 110 (e.g., based on a combination of the application, service, or flow identification information that is signaled to the HCPE 110 by the HAG 120 and the information that is available locally at the HCPE 110).

In this manner, the HCPE 110 and HAG 120 may cooperate to improve path selection for downlink traffic being provided from the HAG 120 to the HCPE 110. The HCPE 110 is able to locally control the path(s) (e.g., transport subflow(s)) over which the downlink traffic is sent to the HCPE 110 by the HAG 120. The intelligent path selection may be performed by the HCPE 110, even though the HCPE 110 typically cannot support advanced traffic analysis capabilities (e.g., DPI), without negatively impacting HCPE performance and throughput capacity of the HCPE 110. The intelligent path selection may be performed by the HCPE 110, even though the HCPE 110 typically cannot support advanced traffic analysis capabilities (e.g., DPI), while also potentially making use of real-time information available at the HCPE 110 that is not typically available at the HAG 120 for use in performing path selection for downlink traffic being provided to the HCPE 110 (e.g., thereby putting the HCPE 110 in a better position than the HAG 120 to control the path(s) used for the downlink traffic even though the downlink traffic is being provided from the HAG 120 to the HCPE 110).

The HCPE 110 and the HAG 120 may be configured to support HCPE-based intelligent path selection for downlink traffic intended for one of the CPEs 112 of the customer premises 111 of HCPE 110 using path selection control elements provided on the HCPE 110 and the HAG 120, respectively. The path selection control elements may include a path selection control element 116 on MPTCP proxy 115 of HCPE 110 and a path selection control element 126 on MPTCP proxy 125 of HAG 120. The path selection control element 116 of MPTCP proxy 115 of HCPE 110 may be configured to support various functions presented herein as being supported by the HCPE 110 within the context of intelligent path selection (e.g., extraction of the signaled indicators of the application, service, or flow identification information of the downlink traffic, application of the signaled indicators and policy information for controlling path selection for downlink traffic, or the like, as well as various combinations thereof). The path selection control element 126 of MPTCP proxy 125 of HAG 120 may be configured to support various functions presented herein as being supported by the HCPE 110 within the context of intelligent path selection (e.g., use of DPI for determining application, service, or flow identification information of the downlink traffic, insertion of the signaled indicators of the application, service, or flow identification information of the downlink traffic into the downlink traffic, or the like, as well as various combinations thereof). It will be appreciated that the HCPE 110 and the HAG 120 may be configured to support HCPE-based intelligent path selection in various other ways (e.g., using path selection control elements implemented at other locations of the HCPE 110 or the HAG 120, using other path selection control elements or related elements on the HCPE 110 or the HAG 120, or the like, as well as various combinations thereof).

It will be appreciated that, although primarily presented herein with respect to embodiments in which the HCPE 110 is configured to control the intelligent path selection for the downlink traffic (e.g., the HAG 120 supports the path selection actions of the HCPE 110), in at least some embodiments the HAG 120 may be configured to retain control over whether the path selection actions initiated by the HCPE 110 are actually carried out. This may be provided in cases where the HCPE 110 is, or should not, be trusted to make path selection decisions for downlink traffic. The HAG 120 may be configured to override the path selection actions initiated by the HCPE 110. For example, the HAG 120 may be configured to accept or deny transport subflow requests made by the HCPE 110 for the multipath connection (e.g., requests to add transport subflows, requests to modify transport subflows, requests to terminate transport subflows, or the like). This capability of the HAG 120 may be provided at various levels of granularity, such as on a per-HCPE basis (e.g., certain HCPEs may be permitted to control path selection of downlink traffic while other HCPEs may be prevented from controlling path selection of downlink traffic), a per application, service, or flow type basis (e.g., HCPE-based path selection may be supported for certain application, service, or flow types and denied for other application, service, or flow types), a per application, service, or flow basis (e.g., HCPE-based path selection may be supported for certain applications, services, or flows and denied for other applications, services, or flows), or the like, as well as various combinations thereof.

It will be appreciated that the HCPE 110 and the HAG 120 may be configured to support various other functions for support HCPE-based intelligent path selection.

Figure 2:
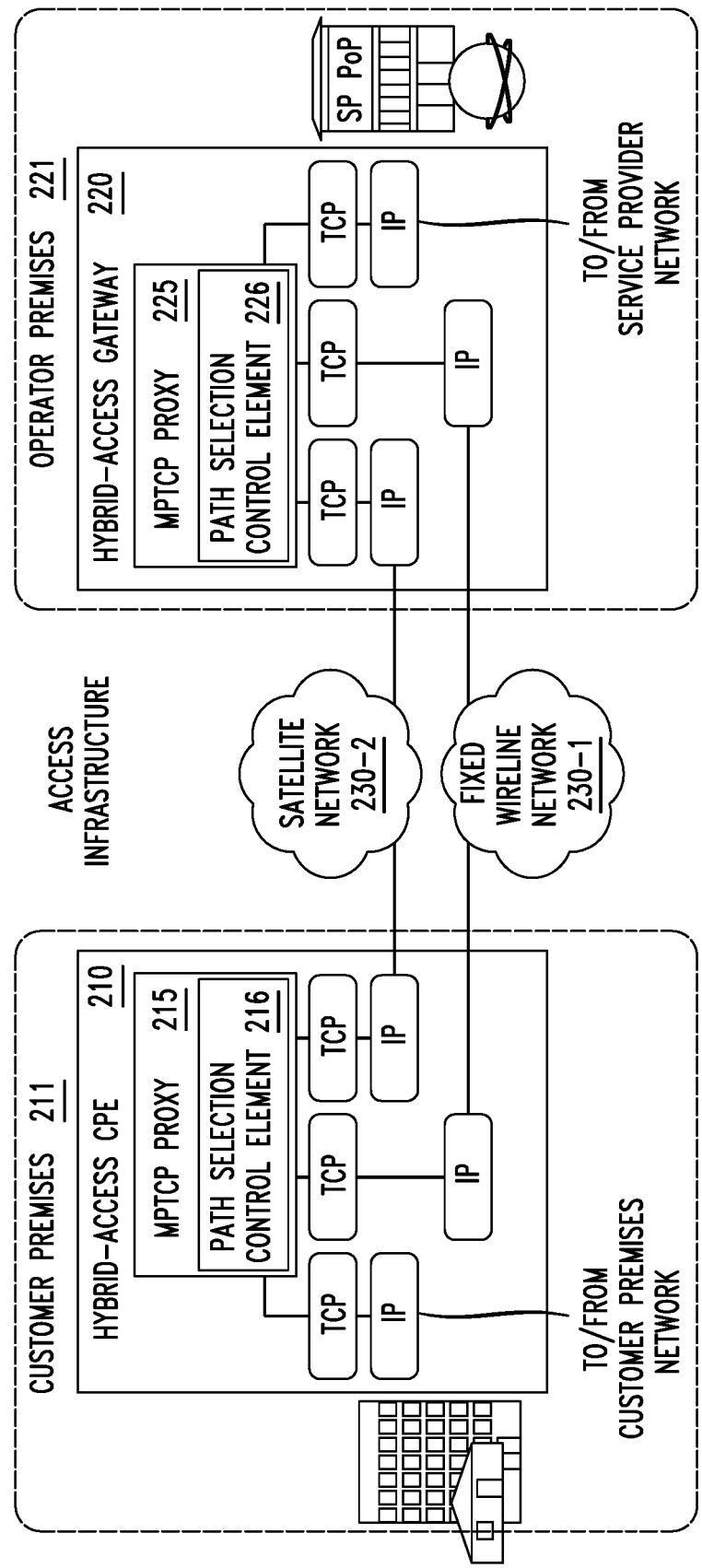
FIG. 2 depicts an example of a communication system configured to support HCPE-based intelligent path selection for downlink traffic over a multipath connection between a HAG and an HCPE.

FIG. 2 depicts an example of a communication system configured to support HCPE-based intelligent path selection for downlink traffic over a multipath connection between a HAG and an HCPE.

The communication system 200 includes an HCPE 210 located at a customer premises 211 (which may be similar to HCPE 110 of FIG. 1), a HAG 220 located within an operator premises 221 (which may be similar to HAG 120 of FIG. 1), and access infrastructure including a pair of access networks 230 (illustratively, a fixed wireline network 230-1 (e.g., a DSL network) and a satellite network 230-2).

The HCPE 210 is configured to operate as a gateway of the customer premises 211 for a set of CPEs (omitted for purposes of clarity) located at the customer premises 211. The HCPE 210 is configured to communicate via each of the access networks 230, for supporting use of multiple access networks 230 to communicate traffic between the HCPE 210 and the HAG 220. The HCPE 210 is configured to communicate with CPEs at the customer premises 211 via a customer premises network.

The HAG 220 is configured to operate as a gateway of the operator premises 211 for the HCPE 210 (as well as for other HCPEs associated with other customer premises, which have been omitted for purposes of clarity). The HAG 220 is configured to communicate via each of the access networks 230, for supporting use of multiple access networks 230 in order to communicate traffic between the HAG 220 and the HCPE 210. The HAG 220 is configured to communicate with a service provider network which may provide access to various other networks (e.g., private data networks such as data center networks or enterprise networks, public data networks such as the Internet, or the like, as well as various combinations thereof).

The access networks 230 provide different types of access infrastructure options (having different characteristics which may be useful for different types of traffic, under different conditions, or the like) for the HCPE 210 and the HAG 220. For example, the fixed wireline network 230-1 is a lower capacity/lower latency access network providing a lower capacity/higher latency access link and the satellite network 230-2 is a higher capacity/higher latency access network providing a higher capacity/higher latency access link.

The HCPE 210 and HAG 220 support multipath communications based on MPTCP. The HCPE 210 includes an MPTCP proxy 215 and the HAG 220 includes an MPTCP proxy 225. The HCPE 210 and HAG 220 communicate via an MPTCP connection between the MPTCP element 215 of the HCPE 210 and the MPTCP proxy 225 of the HAG 220. The MPTCP connection includes a first TCP subflow over the fixed wireline network 230-1 and a second TCP subflow over the satellite network 230-2.

The HCPE 210 and HAG 220 support HCPE-based path selection for downlink traffic being sent from the HAG 220 to the HCPE 210 via the MPTCP connection. In this example, it is assumed that the downlink traffic is streaming video content. The HCPE 210 could initiate video streaming over the first TCP subflow over the lower capacity/lower latency access link of the fixed wireline network 230-1 in order to accelerate buffering and provide a more pleasant viewing experience and, then, based on the application, service, or flow identification information that is received by the HCPE 210 from the HAG 220, could initiate termination of the first TCP subflow over the lower capacity/lower latency access link of the fixed wireline network 230-1 in order to force the streaming video content to continue over the second TCP subflow over the higher capacity/higher latency access link of the satellite network 230-2. It is noted that this process could be repeated or cycled to accommodate various video streaming events (e.g., pause, stop, or the like), such as by, responsive to a given video streaming event, initiating re-establishment of the first TCP subflow for the MPTCP connection using the lower capacity/lower latency access link of the fixed wireline network 230-1, initiating termination of the second TCP subflow over the higher capacity/latency access link of the satellite network 230-2 in order to force the streaming video content to continue over the re-established first TCP subflow over the lower capacity/latency access link of the fixed wireline network 230-1 in order to support buffering associated with the video streaming event, and initiating termination of the re-established first TCP subflow over the lower capacity/latency access link of the fixed wireline network 230-1 in order to force the streaming video session back onto the second TCP subflow over the higher capacity/latency access link of the satellite network 230-2.

It will be appreciated that the foregoing example is merely one of the various ways in which the HCPE 210 may control the transport subflows of a multipath connection to provide intelligent HCPE-based path selection of downlink traffic at the HCPE 210 (e.g., various other numbers or types of TCP subflows of an MPTCP connection may be established, modified, and/or terminated over various other types of access networks in order to provide intelligent HCPE-based path selection of downlink traffic at the HCPE 210).

Figure 3:
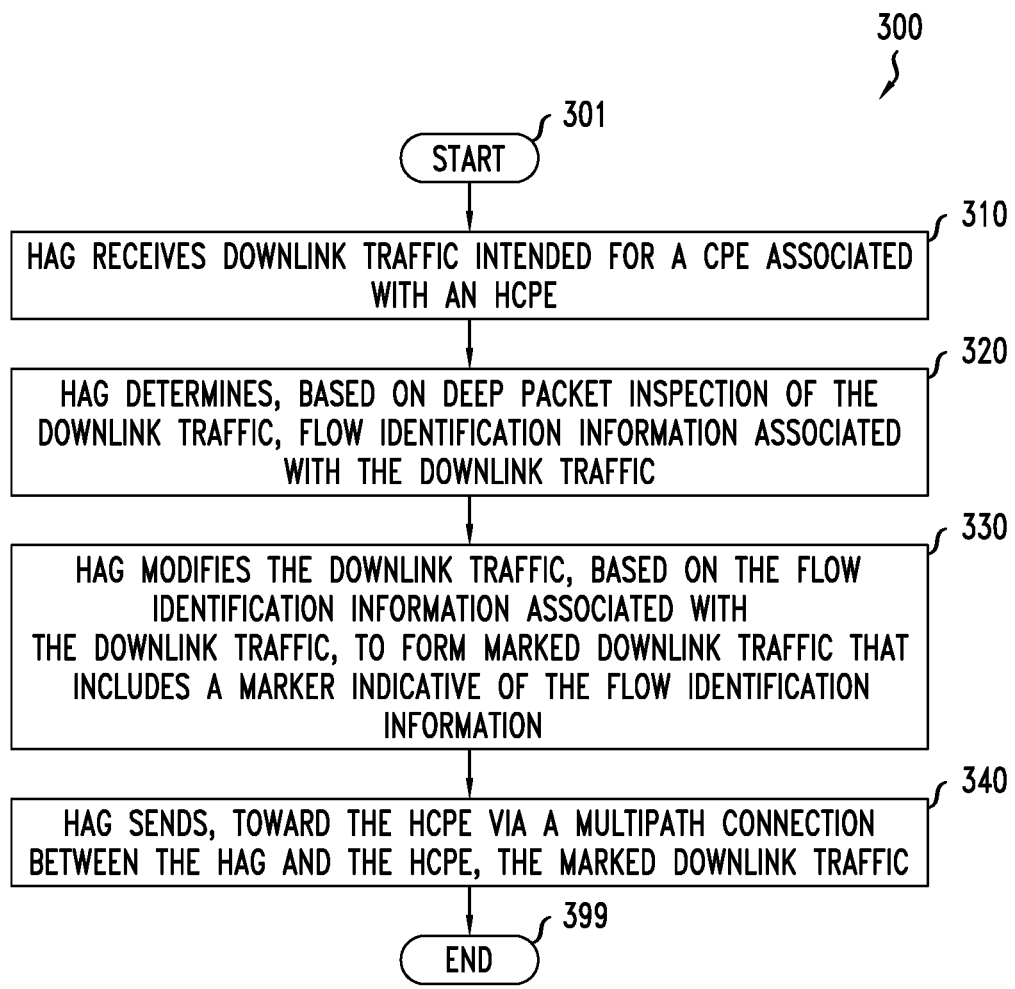
FIG. 3 depicts an example of a method for use by a HAG to support HCPE-based intelligent path selection for downlink traffic over a multipath connection between the HAG and an HCPE.

FIG. 3 depicts an example of a method for use by a HAG to support HCPE-based intelligent path selection for downlink traffic over a multipath connection between the HAG and an HCPE. It will be appreciated that, although presented as being performed serially, at least a portion of the functions of method 300 may be performed contemporaneously or in a different order than as presented in FIG. 3. At block 301, method 300 begins. At block 310, the HAG receives downlink traffic intended for a CPE associated with an HCPE. At block 320, the HAG determines, based on deep packet inspection of the downlink traffic, application, service, or flow identification information associated with the downlink traffic. At block 330, the HAG modifies the downlink traffic, based on the application, service, or flow identification information associated with the downlink traffic, to form marked downlink traffic that includes a marker indicative of the application, service, or flow identification information. At block 340, the HAG sends, toward the HCPE via a multipath connection between the HAG and the HCPE, the marked downlink traffic. At block 399, method 300 ends.

Figure 4:
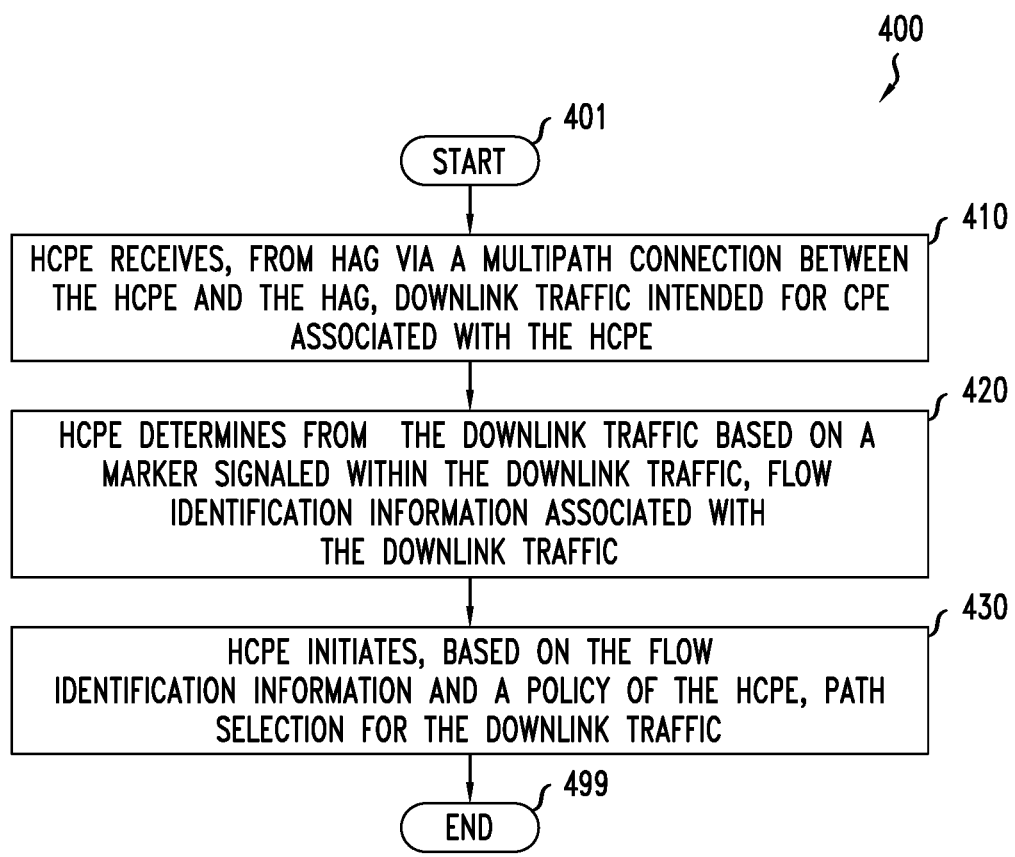
FIG. 4 depicts an example of a method for use by an HCPE to support HCPE-based intelligent path selection for downlink traffic over a multipath connection between a HAG and the HCPE.

FIG. 4 depicts an example of a method for use by an HCPE to support HCPE-based intelligent path selection for downlink traffic over a multipath connection between a HAG and the HCPE. It will be appreciated that, although presented as being performed serially, at least a portion of the functions of method 400 may be performed contemporaneously or in a different order than as presented in FIG. 4. At block 401, method 400 begins. At block 410, the HCPE receives, from the HAG via a multipath connection between the HCPE and the HAG, downlink traffic intended for CPE associated with the HCPE. At block 420, the HCPE determines from the downlink traffic based on a marker signaled within the downlink traffic, application, service, or flow identification information associated with the downlink traffic. At block 430, the HCPE initiates, based on the application, service, or flow identification information and a policy of the HCPE, path selection for the downlink traffic. At block 499, method 400 ends.

It will be appreciated that, although primarily presented herein within the context of providing embodiments of the path selection capability within the context of a specific type of hybrid access technology (e.g., hybrid access as defined by the Broadband Forum), various embodiments of the path selection capability may be provided within the context of various other types of hybrid access technologies.

It will be appreciated that, although primarily presented herein within the context of providing embodiments of the path selection capability within the context of hybrid access technology (e.g., where multiple access technology types are available for communications between the customer premises and the network), various embodiments of the path selection capability may be provided within the context of single access technologies (e.g., using multiple transport subflows which may traverse multiple access networks of the same access network technology, using multiple transport subflows which may traverse a single access network, or the like).

Various embodiments of the path selection capability may provide various advantages or potential advantages. Various embodiments of the path selection capability enable the HCPE to perform intelligent path selection without requiring the HCPE to support advanced computing functions typically needed to perform DPI for application and service identification. Various embodiments of the path selection capability enable the HCPE to perform intelligent path selection based on application, service, or flow identification information without requiring use of explicit signaling (e.g., without the need for an explicit signaling channel, an explicit signaling protocol, or the like). Various embodiments of the path selection capability enable the HCPE to perform intelligent path selection even though HCPE devices are typically low-cost embedded system-on-chip devices lacking advanced compute facilities to perform DPI without having a dramatic impact on the HCPE performance and throughput capacity. Various embodiments of the path selection capability enable the HCPE to perform intelligent path selection using application, service, or flow identification information as well as real-time information available at the HCPE that is not typically available at the HAG for use in performing path selection for downlink traffic being provided to the HCPE. Various embodiments of the path selection capability may provide various other advantages or potential advantages.

Figure 5:
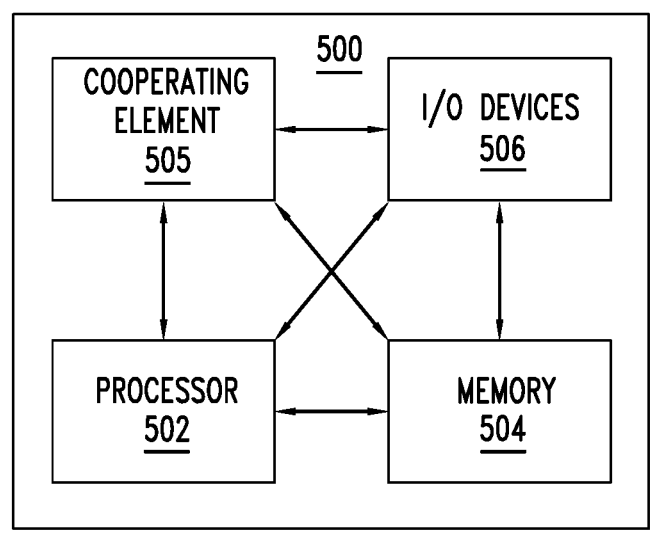
FIG. 5 depicts a high-level block diagram of a computer suitable for use in performing various functions presented herein.

FIG. 5 depicts a high-level block diagram of a computer suitable for use in performing various functions described herein.

The computer 500 includes a processor 502 (e.g., a central processing unit (CPU), a processor having a set of one or more processor cores, or the like) and a memory 504 (e.g., a random access memory (RAM), a read only memory (ROM), or the like). The processor 502 and the memory 504 are communicatively connected.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a non-transitory computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices or elements (e.g., a tape drive, a floppy drive, a hard disk drive, a compact disk drive, or the like), or the like, as well as various combinations thereof.

It will be appreciated that computer 500 of FIG. 5 may represent a general architecture and functionality suitable for implementing functional elements described herein, portions of functional elements described herein, or the like, as well as various combinations thereof. For example, computer 500 may provide a general architecture and functionality that is suitable for implementing one or more of an HCPE or a portion thereof, a HAG or a portion thereof, an element of a customer premises network or a portion thereof, a CPE or a portion thereof, an element of an access network or a portion thereof, or the like.

It will be appreciated that the functions depicted and described herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits (ASIC), and/or any other hardware equivalents).

It will be appreciated that at least some of the functions discussed herein as software methods may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including computer program code;
   wherein the at least one memory and the computer program code are configured to, with the at least one processor, cause the apparatus to at least:
      receive, by a hybrid-access customer premises equipment (HCPE) from a hybrid-access gateway (HAG) via a multipath connection between the HCPE and the HAG, downlink traffic intended for a customer premises equipment (CPE) associated with the HCPE;
      determine, by the HCPE from the downlink traffic based on a marker signaled within the downlink traffic, flow identification information associated with the downlink traffic; and
      initiate, by the HCPE based on the flow identification information and a policy of the HCPE, control by the HCPE over path selection performed at the HAG for the downlink traffic.

2. The apparatus of claim 1, wherein the multipath connection comprises a set of transport subflows.

3. The apparatus of claim 2, wherein the multipath connection comprises a Multipath Transmission Control Protocol (MPTCP) connection, wherein the transport subflows comprise TCP subflows.

4. The apparatus of claim 1, wherein the multipath connection comprises a set of transport subflows associated with a set of access networks.

5. The apparatus of claim 4, wherein the set of access networks comprises at least two of a digital subscriber line (DSL) access network, a Data Over Cable Service Interface Specification (DOC SIS) access network, a passive optical network (PON) access network, a cellular access network, a fixed wireless access network, a WiFi access network, or a satellite access network.

6. The apparatus of claim 1, wherein the marker comprises a Differentiated Services Code Point (DSCP) value, a Transmission Control Protocol (TCP) source port value, or an Internet Protocol (IP) Flow Label value.

7. The apparatus of claim 1, wherein the flow identification information comprises at least one of an indication of a flow type of the downlink traffic or an indication of a specific flow of the downlink traffic.

8. The apparatus of claim 1, wherein, to initiate control by the HCPE over path selection performed at the HAG for the downlink traffic, the at least one memory and the computer program code are configured to, with the at least one processor, cause the apparatus to at least:
   initiate, by the HCPE, termination of an existing transport subflow of the multipath connection.

9. The apparatus of claim 1, wherein, to initiate control by the HCPE over path selection performed at the HAG for the downlink traffic, the at least one memory and the computer program code are configured to, with the at least one processor, cause the apparatus to at least:
   send, by the HCPE toward the HAG, an indication of a path of the multipath connection to be used as a backup path for the downlink traffic.

10. The apparatus of claim 9, wherein the indication of the path of the multipath connection to be used as the backup path for the downlink traffic is sent using an RFC 6824 Change Subflow Priority (MP PRIO) Option Backup (B) flag.

11. The apparatus of claim 1, wherein the policy of the HCPE comprises at least one of:
   a rule indicative that the downlink traffic is to be switched from using a first set of transport subflow of the multipath connection to using a second set of transport subflow of the multipath connection based on a condition being satisfied.

12. The apparatus of claim 11, wherein one of:
   the first set of transport subflows of the multipath connections includes a first transport subflow of the multipath connection and the second set of transport subflows of the multipath connections includes a second transport subflow of the multipath connection; or
   the first set of transport subflows of the multipath connections includes all transport subflows of the multipath connection and the second set of transport subflows of the multipath connections includes only a single transport subflow of the multipath connection.

13. The apparatus of claim 11, wherein the condition comprises at least one of a threshold length of time passing, a threshold amount of data being received, or a buffer fill level being satisfied.

14. A method, comprising:
   receiving, by a hybrid-access customer premises equipment (HCPE) from a hybrid-access gateway (HAG) via a multipath connection between the HCPE and the HAG, downlink traffic intended for a customer premises equipment (CPE) associated with the HCPE;
   determining, by the HCPE from the downlink traffic based on a marker signaled within the downlink traffic, flow identification information associated with the downlink traffic; and
   initiating, by the HCPE based on the flow identification information and a policy of the HCPE, control by the HCPE over path selection performed at the HAG for the downlink traffic.

15. An apparatus, comprising:
   at least one processor; and
   at least one memory including computer program code;
   wherein the at least one memory and the computer program code are configured to, with the at least one processor, cause the apparatus to at least:

receive, by a hybrid-access gateway (HAG), downlink traffic intended for a customer premises equipment (CPE) associated with a hybrid-access customer premises equipment (HCPE);
determine, based on deep packet inspection of the downlink traffic, flow identification information associated with the downlink traffic;
modify the downlink traffic based on the flow identification information associated with the downlink traffic, to form marked downlink traffic that includes a marker indicative of the flow identification information;
send, by the HAG toward the HCPE via a multipath connection between the HAG and the HCPE, the marked downlink traffic; and
perform, by the HAG based on control by the HCPE, control over path selection at the HAG for the downlink traffic.

16. The apparatus of claim 15, wherein the multipath connection comprises a set of transport subflows.

17. The apparatus of claim 16, wherein the multipath connection comprises a Multipath Transmission Control Protocol (MPTCP) connection, wherein the transport subflows comprise TCP subflows.

18. The apparatus of claim 15, wherein the multipath connection comprises a set of transport subflows associated with a set of access networks.

19. The apparatus of claim 18, wherein the set of access networks comprises at least two of a digital subscriber line (DSL) access network, a Data Over Cable Service Interface Specification (DOCSIS) access network, a passive optical network (PON) access network, a cellular access network, a fixed wireless access network, a WiFi access network, or a satellite access network.

20. The apparatus of claim 15, wherein the marker comprises a Differentiated Services Code Point (DSCP) value, a Transmission Control Protocol (TCP) source port value, or an Internet Protocol (IP) Flow Label value.

21. The apparatus of claim 15, wherein the flow identification information comprises at least one of an indication of a flow type of the downlink traffic or an indication of a specific flow of the downlink traffic.

22. The apparatus of claim 15, wherein the at least one memory and the computer program code are configured to, with the at least one processor, cause the apparatus to at least:
receive, by the HAG from the HCPE, an indication of a path of the multipath connection to be used as a backup path for the downlink traffic.

23. The apparatus of claim 22, wherein the indication of the path of the multipath connection to be used as the backup path for the downlink traffic is received using an RFC 6824 Change Subflow Priority (MP PRIO) Option Backup (B) flag.

24. A method, comprising:
receiving, by a hybrid-access gateway (HAG), downlink traffic intended for a customer premises equipment (CPE) associated with a hybrid-access customer premises equipment (HCPE);
determining, based on deep packet inspection of the downlink traffic, flow identification information associated with the downlink traffic;
modifying the downlink traffic, based on the flow identification information associated with the downlink traffic, to form marked downlink traffic that includes a marker indicative of the flow identification information;
sending, by the HAG toward the HCPE via a multipath connection between the HAG and the HCPE, the marked downlink traffic; and
performing, by the HAG based on control by the HCPE, control over path selection at the HAG for the downlink traffic.

25. An apparatus, comprising:
at least one processor; and
at least one memory including computer program code;
wherein the at least one memory and the computer program code are configured to, with the at least one processor, cause the apparatus to at least:
determine, by a hybrid-access customer premises equipment (HCPE) based on a marker signaled within downlink traffic received by the HCPE via a multipath connection between the HCPE and a hybrid-access gateway (HAG), flow identification information associated with the downlink traffic; and
initiate, by the HCPE based on the flow identification information, control over path selection performed by the HAG for the downlink traffic by initiating termination of a transport subflow of the multipath connection.

26. An apparatus, comprising:
at least one processor; and
at least one memory including computer program code;
wherein the at least one memory and the computer program code are configured to, with the at least one processor, cause the apparatus to at least:
determine, by a hybrid-access customer premises equipment (HCPE) based on a marker signaled within downlink traffic received by the HCPE via a multipath connection between the HCPE and a hybrid-access gateway (HAG), flow identification information associated with the downlink traffic; and
initiate, by the HCPE based on the flow identification information, control over path selection performed by the HAG for the downlink traffic by sending toward the HAG an indication that a transport subflow of the multipath connection is to be used as a backup subflow for the downlink traffic.

* * * * *